(12) United States Patent
Nambi

(10) Patent No.: US 11,206,290 B2
(45) Date of Patent: Dec. 21, 2021

(54) SESSION INITIATION PROTOCOL (SIP) NOTIFICATIONS FOR INTERNET OF THINGS (IOT)

(71) Applicant: HEWLETT PACKARD ENTERPRISE DEVELOPMENT LP, Houston, TX (US)

(72) Inventor: Grace Priscilla Nambi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 98 days.

(21) Appl. No.: 15/658,350

(22) Filed: Jul. 24, 2017

(65) Prior Publication Data

US 2018/0048680 A1 Feb. 15, 2018

(30) Foreign Application Priority Data

Aug. 12, 2016 (IN) .............................. 201641027682

(51) Int. Cl.
*H04L 29/06* (2006.01)
*H04L 29/08* (2006.01)

(52) U.S. Cl.
CPC ...... *H04L 65/1006* (2013.01); *H04L 65/1069* (2013.01); *H04L 67/12* (2013.01); *H04L 67/146* (2013.01)

(58) Field of Classification Search
CPC . H04L 65/1006; H04L 65/1069; H04L 67/12; H04L 67/146
See application file for complete search history.

(56) References Cited

U.S. PATENT DOCUMENTS

| | | | |
|---|---|---|---|
| 2008/0037447 A1* | 2/2008 | Garg | H04L 29/06027 370/260 |
| 2014/0359131 A1* | 12/2014 | Seed | H04W 4/70 709/226 |
| 2016/0344841 A1* | 11/2016 | Wang | H04W 4/70 |
| 2017/0109794 A1* | 4/2017 | Smith | G06Q 30/0277 |

* cited by examiner

*Primary Examiner* — Joshua D Taylor
(74) *Attorney, Agent, or Firm* — Hewlett Packard Enterprise Patent Department

(57) ABSTRACT

Examples described relate to using Session Initiation Protocol (SIP) notifications for Internet of Things (IoT). In an example, in response to an event on a first device in an Internet of Things (IoT) network, the first device may send an event request Uniform Resource Identifier (URI) to a hub device. In response to the event request URI, the first device may receive an event response URI corresponding to a second device in the IoT network from the hub device. The first device may transmit an out-of-dialog Session Initiation Protocol (SIP) notification for the event to the second device.

20 Claims, 4 Drawing Sheets

SESSION INITIATION PROTOCOL (SIP) NOTIFICATIONS FOR INTERNET OF THINGS (IOT)

BACKGROUND

The Internet of Things (IoT) may be defined as a system of devices, animals or people that are provided with unique identifiers that allow them to transfer data over a network. These objects may be embedded with sensors that enable these objects to collect and exchange data.

BRIEF DESCRIPTION OF THE DRAWINGS

For a better understanding of the solution, examples will now be described, purely by way of example, with reference to the accompanying drawings, in which.

DETAILED DESCRIPTION

In the Internet of Things, "things" may refer to a wide variety of devices such as heart monitoring implants, biochip transponders on farm animals, automobiles with built-in sensors, smart lights, and smart thermostat systems that may allow remote monitoring. Each "thing" may be assigned a unique identifier (for example, an IP address) and provided with the ability to collect and exchange data over a network.

It is expected that the Internet of Things may grow to include billions of devices in the near future. Considering the growth prospects, it may be desirable to have a communication mechanism that allows IoT devices to communicate with each other in a faster and efficient way without human intervention. The present approaches related to communication among IoT devices may be slow, inefficient, and require human intervention. Some approaches to communication among IoT devices include using a constrained version of the Session Initiation Protocol (SIP) wherein a session instantiation may include a negotiation phase of some parameters which may be used for all subsequent communication. These approaches do not use the standard SIP protocol and out-of-dialog SIP notifications for communication among IoT devices.

To address these technical challenges the present disclosure describes various examples for using Session Initiation Protocol (SIP) notifications for Internet of Things (IoT) communications. In an example, in response to an event on a first device in an Internet of Things (IoT) network, the first device may send an event request Uniform Resource Identifier (URI) to a hub device. In response to the event request URI, the first device may receive an event response URI corresponding to a second device in the IoT network from the hub device. The first device may transmit an out-of-dialog Session Initiation Protocol (SIP) notification for the event to the second device.

Figure 1:
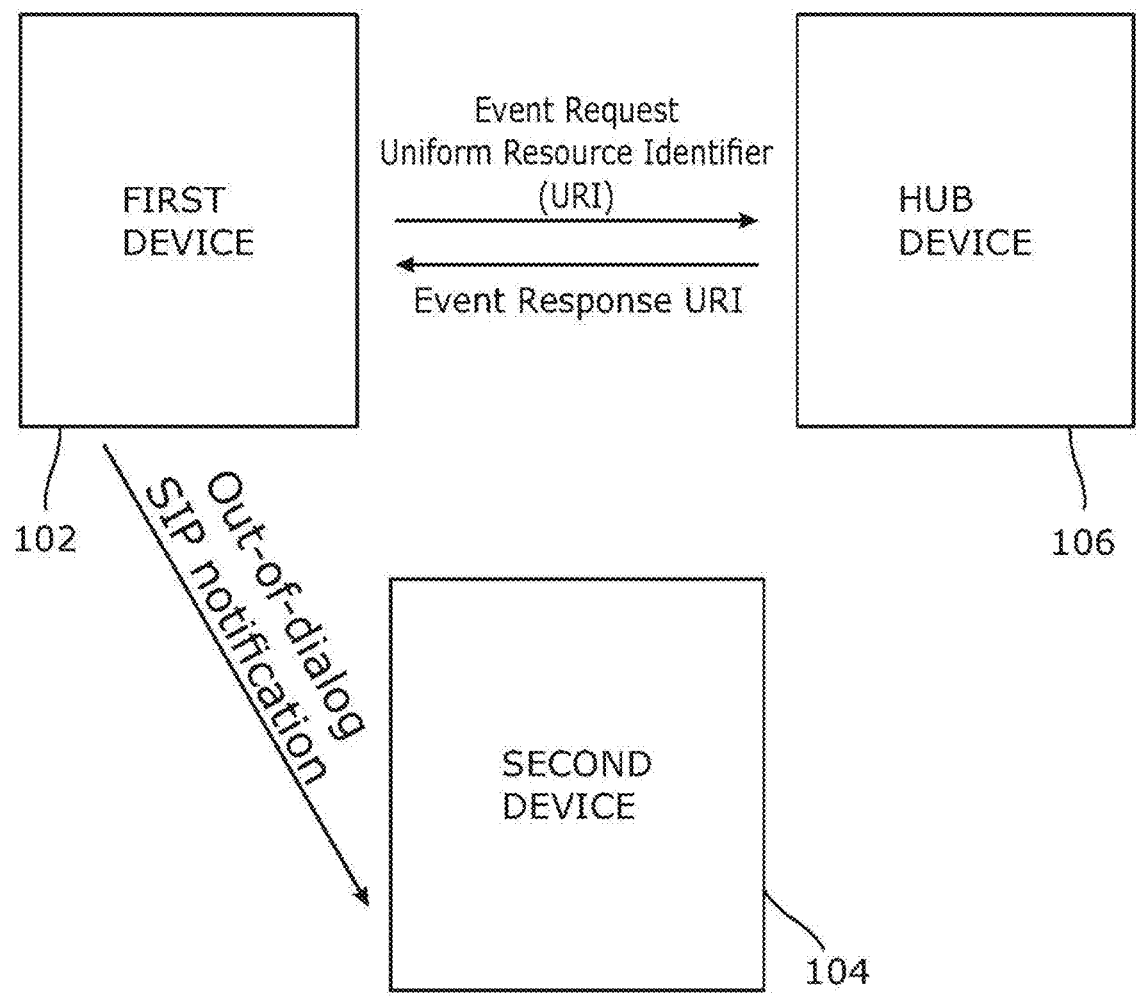
FIG. 1 is a block diagram of an example computing environment illustrating use of Session Initiation Protocol (SIP) notifications for Internet of Things (IoT)

FIG. 1 is a block diagram of an example computing environment 100 illustrating use of Session Initiation Protocol (SIP) notifications for Internet of Things (IoT). In an example, computing environment 100 may include computing devices 102 and 104, and a hub device 106. Although two computing devices are shown in FIG. 1, other examples of this disclosure may include more than two computing devices. Computing devices 102 and 104 may be referred to as "IoT devices". For example, computing device 102 may be referred to as "first IoT device" or "first device", and computing device 104 may be referred to as "second IoT device" or "second device".

In an example, computing devices 102 and 104 may represent any type of system capable of executing machine-readable instructions. For example, computing device 102 and 104 may represent embedded computing devices that transmit and receive information over a network. Some non-limiting examples of the computing devices 102 and 104 may include a desktop computer, a notebook computer, a tablet computer, a thin client, a mobile device, a personal digital assistant (PDA), a phablet, a server, a printer, a network device, an automobile, a clock, a lock, a refrigerator, an enterprise security system, and a coffee maker.

Computing devices 102 and 104 may each include one or more sensors. The sensor(s) may be used to detect events or changes in the environment of the respective computing devices, and then provide a corresponding output. The sensor(s) may provide various types of output, for example, an electrical signal or an optical signal. Some non-limiting examples of the sensor that may be present or embedded on the computing device 102 and 104 may include a pressure sensor, a motion sensor, a light sensor, an infra-red sensor, a humidity sensor, a gas sensor, an acceleration sensor, a color sensor, and a gyro sensor. In an example, computing devices 102 and 104 may each include an actuator. Examples of the actuator may include an electric motor, a hydraulic cylinder, a piezoelectric actuator, and a pneumatic actuator.

Computing devices 102 and 104 may be communicatively coupled, for example, via a network. In an example, the network may be an IoT network. The network may be a wireless (for example, a cellular network) or a wired network. The network may include, for example, a Local Area Network (LAN), a Wireless Local Area Network (WAN), a Metropolitan Area Network (MAN), a Storage Area Network (SAN), a Campus Area Network (CAN), or the like. Further, the network may be a public network (for example, the Internet) or a private network (for example, an intranet). Computing devices may use wired and/or wireless technologies for communication. Examples of wireless technologies may include Radio-frequency identification (RFID), Near-field Communication (NFC), optical tags, Bluetooth low energy (BLE), ZigBee, Thread, LTE-Advanced, and WiFi-Direct. Computing devices 102 and 104 may communicate data and/or signals with each other.

Computing devices 102 and 104 may each support Session Initiation Protocol (SIP). SIP is an application layer communications protocol that may be used for creating, modifying, and terminating sessions with one or more participants (for example, computing devices 102 and 104). SIP is independent from an underlying transport protocol. It may run on, for example, Transmission Control Protocol (TCP), User Datagram Protocol (UDP), and Transport Layer Security (TLS) protocol. SIP may be used for two-party (unicast) or multiparty (multicast) sessions.

Computing devices 102 and 104 may each be assigned a unique identifier. A unique identifier may be used to identify an associated computing device (for example, 102). In an example, the unique identifier may include an IP address (for example, an IPv4 address or an IPv6 address).

In an example, hub device 106 may represent any type of system capable of executing machine-readable instructions. Some non-limiting examples of the hub device 106 may include a server, a desktop computer, a notebook computer, a tablet computer, a thin client, a mobile device, a personal digital assistant (PDA), a phablet, and the like.

Computing devices 102 and 104 may each be in communication with the hub device 106, for example, via a computer network. Such a computer network may be similar to the computer network described above.

In an example, computing devices 102 and 106 may each include an identification engine 120, an event engine 122, a receipt engine 124, and a notification engine 126. For the sake of simplicity, computing device 102 in FIG. 1 is shown to include identification engine 120, event engine 122, receipt engine 124, and notification engine 126, but in other examples, other computing devices of computing environment 100 (for example, 104) may include these engines as well. Engines 120, 122, 124, and 126 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the computing devices 102 and 104. In some examples, the at least one machine-readable storage medium may store instructions that, when executed by the at least one processing resource, at least partially implement some or all engines of the computing device. In such examples, the computing devices 102 and 104 may each include the at least one machine-readable storage medium storing the instructions and the at least one processing resource to execute the instructions.

Identification engine 120 may identify an event on computing device 102. In an example, the event may be generated by a sensor on computing device 102. In another example, the sensor may be communicatively coupled to computing device 102. Further to the identification, identification engine 120 may communicate information related to the event to event engine 122.

In an example, event engine 122 on computing device 102 (or "first IoT device") may send an event request Uniform Resource Identifier (URI) to a hub device (for example, 106) in response to the event on the computing device. For example, the first IoT device may be an enterprise security system that may include a motion detection device such as a Passive Infrared Sensor (PIR) that may detect a disturbance in the infrared spectrum. Once detected, the sensor may generate an event (for example, a signal). In another example, the first IoT device may be an alarm clock that may generate an event (for example, a signal) at a predefined time.

An event request URI may be a unique identifier that identifies an event. Events on the first IoT device may each be assigned a respective unique event request URI for identification. In an example, the event request URI may comprise of an event name and a domain name. For example, the event request URI may be represented as sip:event_name@domain_name. In the context of the enterprise security system scenario described above, an example event URI may include sip:motion_detected@enterprise_name. In the case of the alarm clock scenario described above, an example event URI may inlcude sip:alarm_triggered@clock_name.

The hub device 106 may store one or more event response URIs corresponding to an event request URI. Each event response URI may correspond to a respective device (for example, an IoT device) that is to be notified in case an event request URI corresponding to the event response URI of the device is received by the hub device 106. To provide an example, in the context of the enterprise security system scenario described above, two event response URIs corresponding to the event request URI (sip:motion_detected@enterprise_name) may be stored on the hub device. Each event response URI may correspond to a respective device (e.g., a second IoT device and a third IoT device) of the security personnel who are to be notified in the event the event request URI (sip:motion_detected@enterprise_name) is received by the hub device 106. In an example, the second IoT device and the third IoT device may include mobile devices of the security personnel.

In the case of the alarm clock scenario described above, the hub device may store an event response URI corresponding to the event request URI: sip:alarm_triggered@clock_name. The event request URI may correspond to a device, for example, a smart coffee machine.

The event response URI may comprise of an event name and a domain name of a device. For example, the event request URI may be represented as sip:response_name@domain_name. In the context of the enterprise security scenario described above, example event response URIs may include: sip:call_mobilenumber1@device_name1, and sip:call_mobilenumber2@device_name2.

In the case of the alarm clock scenario described above, an example event response URI may include: sip:brew_coffee@coffeemachine_name.

The hub device 106 may store information related to a device corresponding to an event response URI. Such information, may include, for example, a name of the device, a URI of the device, a location of the device, a software component of the device, a hardware component of the device, and a firmware component of the device. The information may be stored, for example, in a database on the hub device 106.

In an example, the hub device 106 may receive an event request URI from the first IoT device. In response, the hub device 106 may determine one or more event response URIs corresponding to the event request URI. As mentioned earlier, each of the event response URIs may correspond to a specific device. In an example, these may be referred to as "second IoT device", "third IoT device", "fourth IoT device, "fifth IoT device", and so and so forth.

Further to the determination, the hub device may send the event response URI(s) to the first IoT device. In an example, the hub device may send information related to a device corresponding to an event response URI to the first IoT device. Such information may include, for example, a name of the identified device, a location of the identified device, a software component of the identified device, a hardware component of the identified device, and a firmware component of the identified device.

Receipt engine 124 on the first IoT device may receive the event response URI(s) of an IoT device(s) (for example, a second IoT device) from the hub device. Receipt engine 124 may analyze the information contained in the received event response URIs, and communicate the event response URI(s) of the IoT device(s) to notification engine 126.

Notification engine 126 on the first IoT device may receive the event response URI(s) of an IoT device(s) (for example, a second IoT device) from receipt engine 124. In response, notification engine 126 may identify the IoT device(s) (for example, a second IoT device) corresponding to the event response URI(s). In an example, notification engine may identify the IoT device(s) from the event response URI and/or information related to the IoT device on the hub device 106.

Notification engine 126 may generate and send an out-of-dialog SIP notification corresponding to the event to the identified IoT device (for example, a second IoT device). In the event, a plurality of IoT devices are identified, notification engine 126 may generate and send a respective out-of-dialog SIP notification corresponding to the event to each of the IoT devices.

In the context of the enterprise security system scenario described above, notification engine 126 may send a respective out-of-dialog SIP notification for the motion detection event to the respective mobile device of the security personnel. In the case of the alarm clock scenario described above, notification engine may send an out-of-dialog SIP notification for the alarm event to the smart coffee maker.

In an example, notification engine 126 may send an out-of-dialog SIP notification corresponding to the event to the identified IoT device (for example, a second IoT device) to generate an action on the identified IoT device. In response to the out-of-dialog SIP notification for the event, the identified IoT device may perform an action. The action may be specific to a device type of the device. In the context of the enterprise security system scenario described above, the action may include, a ring and/or a vibrate action. In the case of the alarm clock scenario described above, action may include brewing coffee on the smart coffee maker. Thus, an action may be performed on the identified IoT device in response to the out-of-dialog SIP notification.

In response to the out-of-dialog SIP notification, the identified IoT device may transmit a response to the first IoT device. In an example, the response may include an acknowledgement message for the out-of-dialog SIP notification received by the identified IoT device. The response may be received by the first IoT device.

Figure 2:
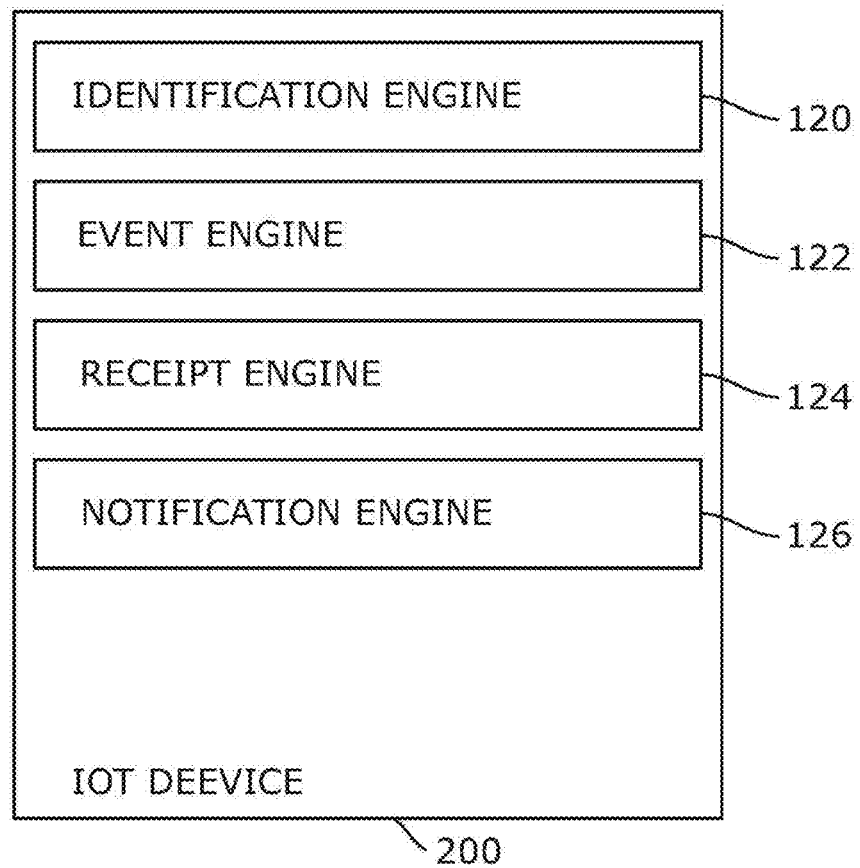
FIG. 2 is a block diagram of an example computing system for using Session Initiation Protocol (SIP) notifications for Internet of Things (IoT)

FIG. 2 is a block diagram of an example IoT device 200 for using Session Initiation Protocol (SIP) notifications for Internet of Things (IoT). In an example, IoT device 200 may be analogous to the computing devices 102 or 104 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

In an example, IoT device 200 may represent any type of computing device capable of reading machine-executable instructions. Examples of the computing device may include, without limitation, a desktop computer, a notebook computer, a tablet computer, a thin client, a mobile device, a personal digital assistant (PDA), a phablet, a server, a printer, a network device, an automobile, a clock, a lock, a refrigerator, and a coffee maker.

IoT device 200 may include one or more sensors. Such a sensor(s) may be similar to the sensor(s) described above. The sensor(s) may be used to detect events or changes in the environment of IoT device 200, and provide a corresponding output. The sensor(s) may provide various types of output, for example, an electrical signal or an optical signal.

In an example, IoT device 200 may be communicatively coupled, for example, via a computer network, to a different IoT device(s). Such an IoT device may be similar to the computing device (for example, 104) described above. Further, such a computer network may be similar to the computer network described above. IoT device 200 may use wired and/or wireless technologies for communication with a different IoT device(s). Examples of wireless technologies may include Radio-frequency identification (RFID), Near-field Communication (NFC), optical tags, Bluetooth low energy (BLE), ZigBee, Thread, LTE-Advanced, and WiFi-Direct. IoT device 200 may communicate data and/or signals with a different computing device(s).

IoT device 200 may be assigned a unique identifier. The unique identifier may be used to identify the IoT device 200. In an example, the unique identifier may include an IP address (for example, an IPv4 address or an IPv6 address).

In an example, IoT device 200 may include an identification engine 120, an event engine 122, a receipt engine 124, and a notification engine 126.

In an example, identification engine 120 may identify an event on the IoT device 200, and communicate information related to the event to event engine 122. Event engine 122 may send an event request Uniform Resource Identifier (URI) corresponding to the event to a hub device (for example, 106). Responsive to the event request URI, receipt engine 124 may receive an event response URI of an Internet of Things (IoT) device from the hub device. Notification engine 126 may then transmit an out-of-dialog Session Initiation Protocol (SIP) notification for the event to the IoT device to generate an action on the IoT device.

Figure 3:
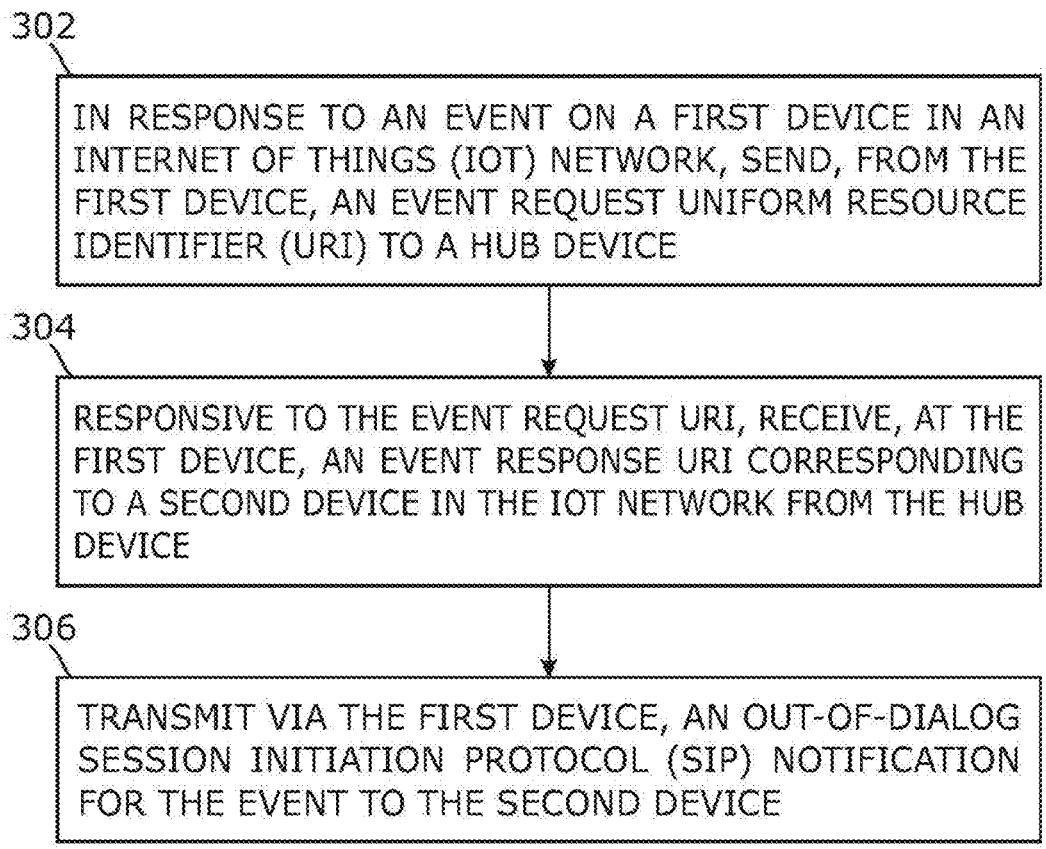
FIG. 3 is a flowchart of an example method of using Session Initiation Protocol (SIP) notifications for Internet of Things (IoT)

FIG. 3 is a flowchart of an example method 300 of using Session Initiation Protocol (SIP) notifications for Internet of Things (IoT). The method 300, which is described below, may be executed on a computing device such as computing device 102 or 104 of FIG. 1, or IoT device 200 of FIG. 2. However, other computing devices may be used as well. At block 302, in response to an event on a first device in an Internet of Things (IoT) network, the first device may send an event request Uniform Resource Identifier (URI) to a hub device. At block 304, in response to the event request URI, the first device may receive an event response URI corresponding to a second device in the IoT network from the hub device. At block 306, the first device may transmit an out-of-dialog Session Initiation Protocol (SIP) notification for the event to the second device.

Figure 4:
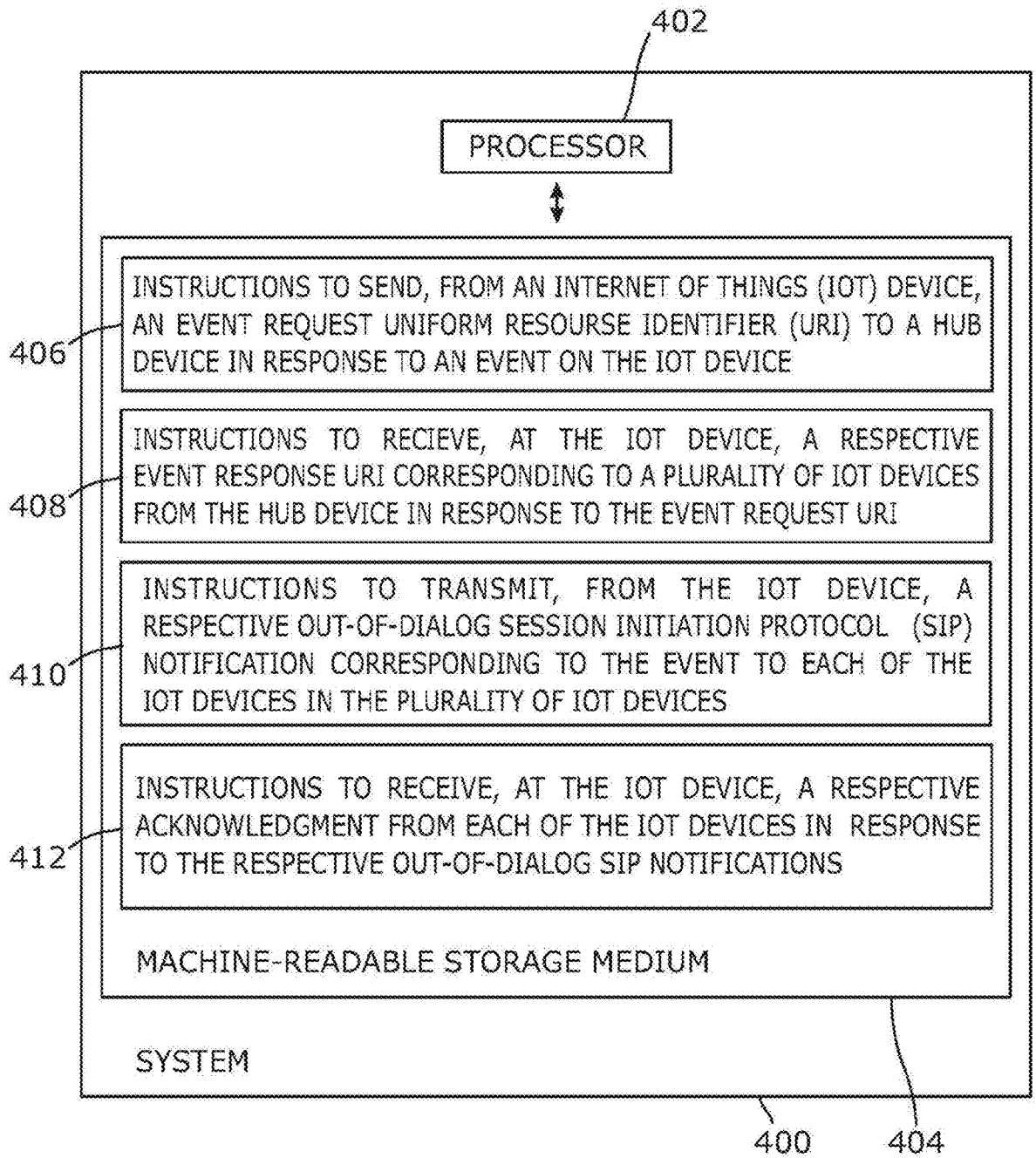
FIG. 4 is a block diagram of an example system including instructions in a machine-readable storage medium for using Session Initiation Protocol (SIP) notifications for Internet of Things (IoT).

FIG. 4 is a block diagram of an example system 400 including instructions in a machine-readable storage medium for using Session Initiation Protocol (SIP) notifications for Internet of Things (IoT). System 400 includes a processor 402 and a machine-readable storage medium 404 communicatively coupled through a system bus. In some examples, system 400 may be analogous to a computing device such as computing device 102 or 104 of FIG. 1, or IoT device 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406, 408, 410, and 412. In an example, instructions 406 may be executed by processor 402 to send, from an Internet of Things (IoT) device, an event request Uniform Resource Identifier (URI) to a hub device in response to an event on the IoT device. Instructions 408 may be executed by processor 402 to receive, at the IoT device, a respective event response URI corresponding to a plurality of IoT devices in response to the event request URI. Instructions 410 may be executed by processor 402 to transmit, from the IoT device, a respective out-of-dialog Session Initiation Protocol (SIP) notification corresponding to the event to each of the IoT devices of the plurality of IoT devices. Instructions 412 may be executed by processor 402 to receive, at the IoT device, a respective acknowledgement from the each of the IoT devices in response to the respective out-of-dialog SIP notification.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method, executable by a processor, the method comprising:
in response to an event detected by a sensor included on a first device in an Internet of Things (IoT) network, sending from the first device, an event request Uniform Resource Identifier (URI) to a hub device, wherein the event request URI comprises an indication of the event detected by the sensor;
responsive to the event request URI, receiving, at the first device, an event response URI corresponding to a second device in the IoT network from the hub device, wherein the received event response is of one or more event responses stored at the hub device and corresponding to the indication of the event in the event request URI, each of the one or more event response URIs corresponding to a device to be notified via the event response URI based on the event request URI for the event; and
sending by the first device based on the event, an out-of-dialog Session Initiation Protocol (SIP) notification corresponding to the event response URI to the second device, wherein the second device is the device corresponding to the event response URI and the event response URI generates an action specific to the second device.

2. The method of claim 1, further comprising:
in response to the out-of-dialog SIP notification, receiving at the first device, a response from the second device.

3. The method of claim 1, further comprising:
responsive to the event request URI, receiving at the first device, an event response URI corresponding to a third device in the IoT network from the hub device.

4. The method of claim 1, further comprising:
generating the out-of-dialog Session Initiation Protocol (SIP) notification corresponding to the event.

5. The method of claim 1, further comprising storing information related to the event response URI corresponding to the second device in the hub device.

6. The method of claim 1, wherein the event is generated by a sensor.

7. The method of claim 1, wherein each of the one or more event response URIs comprises a name for the device to be notified via the event response URI.

8. The method of claim 1, wherein the indication of the event detected by the sensor comprises an event name.

9. An Internet of Things (IoT) device, the device comprising:
an identification engine to identify an event generated by a hardware device on the IoT device;
an event engine to send an event request Uniform Resource Identifier (URI) to a hub device in response to the event, wherein the event request comprises an event name of the event generated by the hardware device;
a receipt engine to receive an event response URI of a second IoT device from the hub device in response to the event request, wherein the event response URI corresponds to the event request URI based on the event name, and the event response URI corresponds to at least one IoT device to be notified via the event response URI based on the event name of the event included in the event request URI; and
a notification engine to transmit an out-of-dialog Session Initiation Protocol (SIP) notification corresponding to the event response URI to the second IoT device, wherein the second device is the device corresponding to the event response URI.

10. The IoT device of claim 9, wherein the event request URI comprises a domain name of the IoT device.

11. The IoT device of claim 9, wherein the event response URI comprises of an event name and a domain name corresponding to the second IoT device.

12. The IoT device of claim 9, wherein the event is generated by a sensor.

13. The IoT device of claim 9, wherein the receipt engine receives a
respective event response URI corresponding to a plurality of IoT devices in response to the event request URI.

14. The IoT device of claim 9, wherein, in response to the out-of-dialog Session Initiation Protocol (SIP), the receipt engine is to receive a response from to the second IoT device.

15. The IoT device of claim 9, wherein the notification engine generates an action specific to the second device.

16. A non-transitory machine-readable storage medium comprising instructions, the instructions executable by a processor to:
send an event request Uniform Resource Identifier (URI) to a centralized hub device from an Internet of Things (IoT) device in response to an event detected by a sensor included on the IoT device, wherein the event request URI comprises an indication of the event detected by the sensor;
receive at the IoT device, a respective event response URI corresponding to a plurality of IoT devices to be notified via the event response URI in response to the event request URI, wherein the respective event response URI is predefined for the event request URI based on the indication of the event;
transmit from the IoT device, a respective out-of-dialog Session Initiation Protocol (SIP) notification corresponding to the event response URI to each of the IoT devices in the plurality of IoT devices;
receive at the IoT device, a respective acknowledgement from each of the IoT devices in response to the respective out-of-dialog SIP notification; and
generate an action on at least one of the IoT devices based on logic that is stored in the centralized hub device.

17. The storage medium of claim 16, further comprising instructions to
generate the respective out-of-dialog Session Initiation Protocol (SIP) notification corresponding to the event for each of the IoT devices.

18. The storage medium of claim 16, wherein the respective out-of-dialog SIP notification generates a respective action on each of the IoT devices.

19. The storage medium of claim 16, wherein the respective action on each of the IoT devices is predefined.

20. The storage medium of claim 16, wherein the instructions are further executable by a processor to receive a response from the second IoT device.

* * * * *